US008210712B2

(12) United States Patent
Ho

(10) Patent No.: US 8,210,712 B2
(45) Date of Patent: Jul. 3, 2012

(54) LED LAMP DEVICE

(75) Inventor: Yen-Wei Ho, Taichung (TW)

(73) Assignee: Genius Electronic Optical Co., Ltd.

( * ) Notice: Subject to any disclaimer, the term of this patent is extended or adjusted under 35 U.S.C. 154(b) by 244 days.

(21) Appl. No.: 12/591,959

(22) Filed: Dec. 7, 2009

(65) Prior Publication Data

US 2011/0089837 A1 Apr. 21, 2011

(30) Foreign Application Priority Data

Oct. 16, 2009 (TW) .............................. 98219179 U

(51) Int. Cl.
*B60Q 1/26* (2006.01)

(52) U.S. Cl. ... 362/227; 362/543; 362/240; 362/249.02; 362/294; 315/294; 315/291; 315/312

(58) Field of Classification Search ................. 362/227, 362/240, 249.02, 294, 311.02, 373, 543–545, 362/800; 315/291, 205, 294, 312
See application file for complete search history.

(56) References Cited

U.S. PATENT DOCUMENTS

| | | | | |
|---|---|---|---|---|
| 5,457,450 | A * | 10/1995 | Deese et al. | 340/912 |
| 6,461,008 | B1 * | 10/2002 | Pederson | 362/35 |
| 7,262,752 | B2 * | 8/2007 | Weindorf | 345/82 |
| 7,766,512 | B2 * | 8/2010 | Chou et al. | 362/294 |

* cited by examiner

*Primary Examiner* — Haiss Philogene
(74) *Attorney, Agent, or Firm* — Raymond Y. Chan; David and Raymond Patent Firm

(57) ABSTRACT

A LED lamp device includes a power unit serially linking a plurality of LED lamp sets by a power cord. The power unit has a regulating circuit, power switch, and an indicator. Each LED lamp set includes a metal heat sink which can be fixed to a specific position by bolts, clamping, gluing, or other method. The metal heat sink has at least one and five most LEDs. The LEDs can be arranged to a metal circuit board, print circuit board, or directly mounted on surface of the metal heat sink. A lens having a receiving space is arranged above the plurality of LEDs.

13 Claims, 6 Drawing Sheets

LED LAMP DEVICE

FIELD OF THE INVENTION

The present invention relates to lamp device, and particular to a LED lamp device having a power unit serially linking 4 to 10 LED lamp sets. The LED lamp device can be installed without a conventional lamp seat.

DESCRIPTION OF THE PRIOR ART

Prior LED lamp such as invention of TW published patent no. M341311 includes at least a LED unit, a heat conducting column, a heat dissipating module having a plurality of dissipating fins radially arranged around the heat conducting column. At least one substrate is placed to center of the dissipating fins for receiving the LED unit. A transparent cover is arranged above the center of the dissipating fins and the LED unit. A top surface of a ring cover is arranged above the heat dissipating module. The ring cover has an open opposite to the transparent cover and the ring cover can bind the heat dissipating module. A circuit board having a power loop connecting all the LED unit through the heat conducting column. A hollow base having the circuit board inside the hollow space thereof has a receiving opening on an upper portion thereof. The receiving opening can be fixed to the dissipating fins. The ring cover has at least one protruding sheet on wall thereof. The protruding sheet can be bent and stuck between two dissipating fins to fix the dissipating module.

Above structure needs a corresponding lamp seat having a power unit and a power switch to form a complete LED lamp device. A cost is raised for such lamp seat required.

Besides, each LED will need a lamp seat with a power unit. If multiple LED lamp device is arranged within an area, the installation and control would become complicated.

SUMMARY OF THE PRESENT INVENTION

Accordingly, the primary object of the present invention is to provide a LED lamp device. A power unit for the device is separated from a plurality of LED lamp set of the device. The LED lamp set can be arranged to specific position without conventional lamp seat. The plurality of LED lamp sets are serially linked by a power cord so that the power unit can supply power to all the LED lamp set for saving cost, simplifying installation and control.

To achieve above object, the present invention provide a LED lamp device including a power unit includes a power unit serial linking a plurality of LED lamp sets by a power cord. The power unit of the present invention is capable of supplying static power to 4 to 40 LED lamp sets.

The power unit mentioned above further includes a regulating circuit for providing stable power to the plurality of the LED lamp sets, a power switch for turning on or turning off the power, and an indicator for showing the position of the power unit.

Each LED lamp device includes a metal heat sink, a plurality of LED, and a lens. The metal heat sink can be fixed to a specific position by fastening retaining components through retaining holes formed to the metal heat sink. The metal heat sink can be also fixed by other known method such as clamping, buckling, gluing, and other equivalent method. At least one and 5 most LED are arranged to a metal circuit board or print circuit board, the circuit board is arranged to the metal heat sink. The LEDs can be also directly fixed to a surface of the metal heat sink by Surface Mounting Technology. The lens has an open receiving place for receiving the plurality of LEDs. A side of the lens is fixed to the metal heat sink by glue. The lens can be also bound by a center opening of a retaining ring. The retaining ring is fixed to the metal heat sink by retaining components.

By the components mentioned above, the LED lamp set can be arranged to any specific position through the metal heat sink with a conventional lamp seat. It is also a great improvement of only one power unit is needed for all the LED lamp set.

The LEDs of the LED lamp set is high power LED. Each LED has a lens arranged above the LED. Or, a large lens is arranged above multiple LEDs.

Each of the optimized LED lamp set has 4 to 10 LEDs. The LEDs can be 5-watt to 15-watt LED and with a total power between 40 watts to 80 watts.

A plurality of LED lamp set can be arranged to an area such as a commercial box or box of a sign board for providing required illumination.

DETAILED DESCRIPTION OF THE INVENTION

Figure 1:
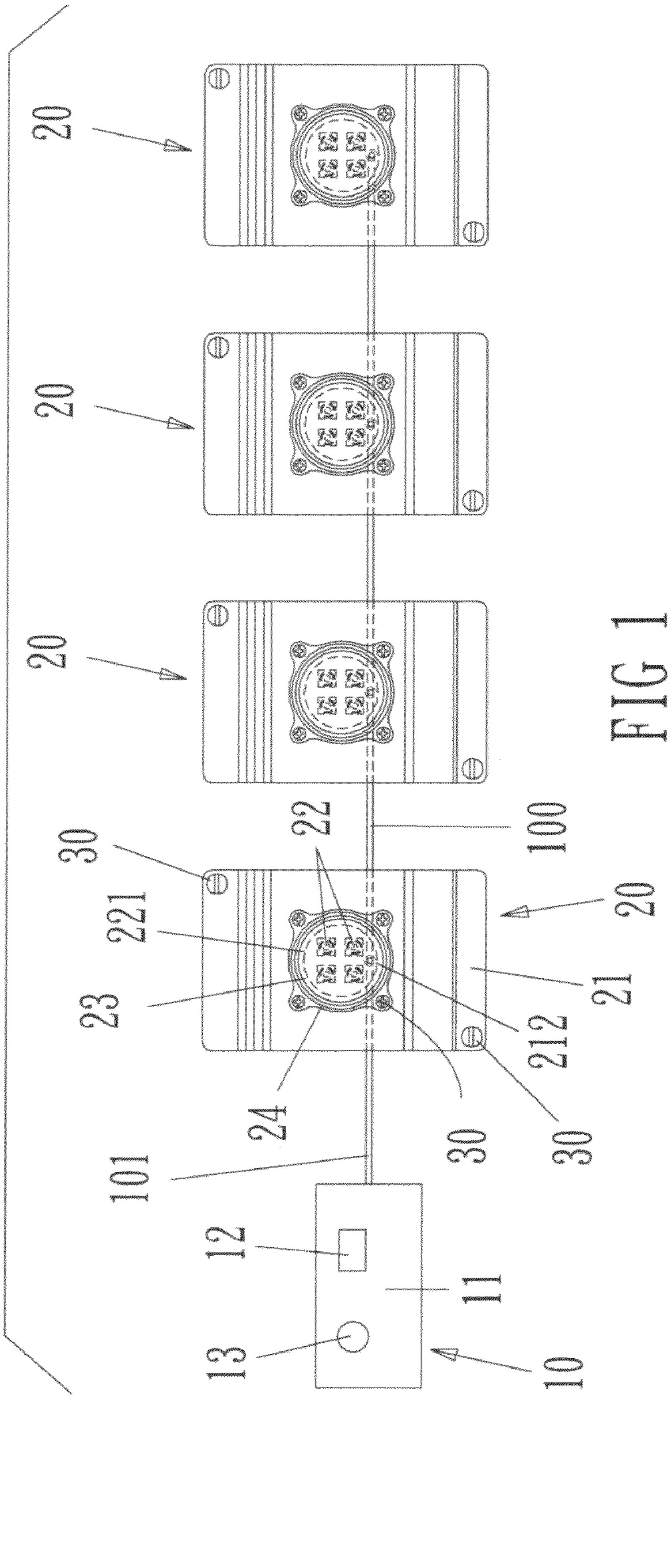
FIG. 1 is a schematic view showing a preferable embodiment of the present invention.

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Referring to FIGS. 1 to 6, a preferable embodiment of a LED lamp device 100 according to the present invention is illustrated. The LED lamp device 100 includes a power unit 10 and a plurality of LED lamp sets 20 serial linked by a power cord 101. The power unit 10 is capable of supplying static power to 4 to 40 LED lamp sets. The power unit 10 of the present invention can save cost for power unit than prior design which each LED has their own power unit.

The power unit 10 has a regulating circuit 11 for stabilizing power, a power switch 12 to turn on or turn off the power, and a power indicator 13 to show the location of the power unit 10.

Each LED lamp set 20 has a metal heat sink 21, a plurality of LEDs 22, and a lens 23. The metal heat sink 21 has a plurality of dissipating fins and retaining holes 211 for being fixed to a predetermined position by retaining components 30. The metal heat sink 21 has a through hole for passing by the power cord 101 linking the LEDs 22. There is 1 to 5 LEDs 22 being arranged to a circuit board 221. The circuit board 221 is fixed to the metal heat sink 21. The transparent lens 23 having an open receiving space for receiving the LEDs 22 is glued to the metal heat sink 21.

By the components mentioned above, the LED lamp set 20 can be arranged to any specific position through the metal heat sink 21 without a conventional lamp seat. It is also a great improvement of only one power unit is needed for all the LED lamp set.

Moreover, the metal heat sink is fixed by the retaining component 30 and retaining holes 211. The retaining method is not used to confine the scope of the present invention, other known method such as clamping, buckling, gluing, or other equivalent methods would be included within the scope of the following claims.

The plurality of LEDs 22 arranged to the circuit 221 can be also directly fixed to the metal heat sink 21 by a Surface Mount Technology (SMT) to save cost.

Figure 2:
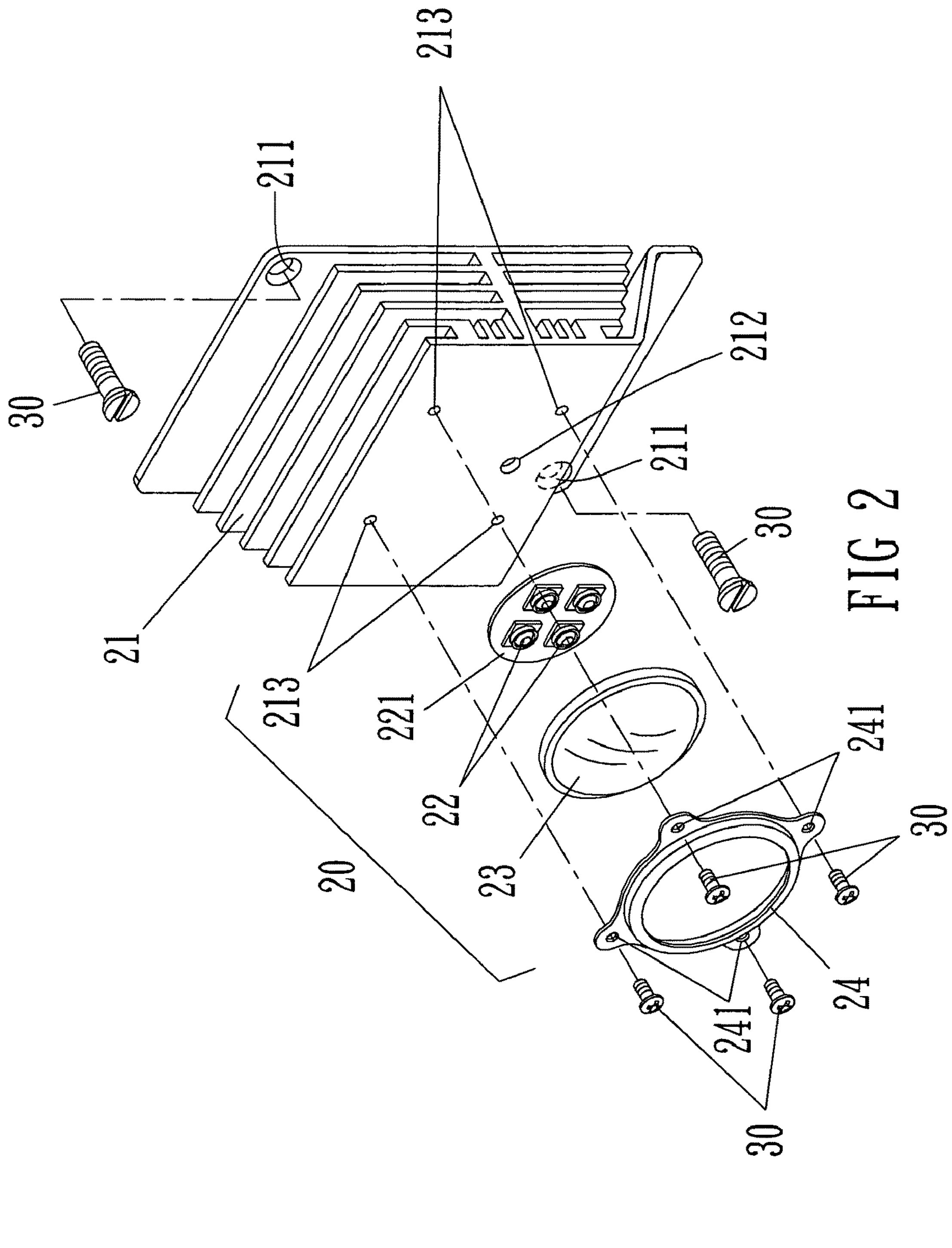
FIG. 2 is a exploded view showing the preferable embodiment of the present invention.
Figure 4:
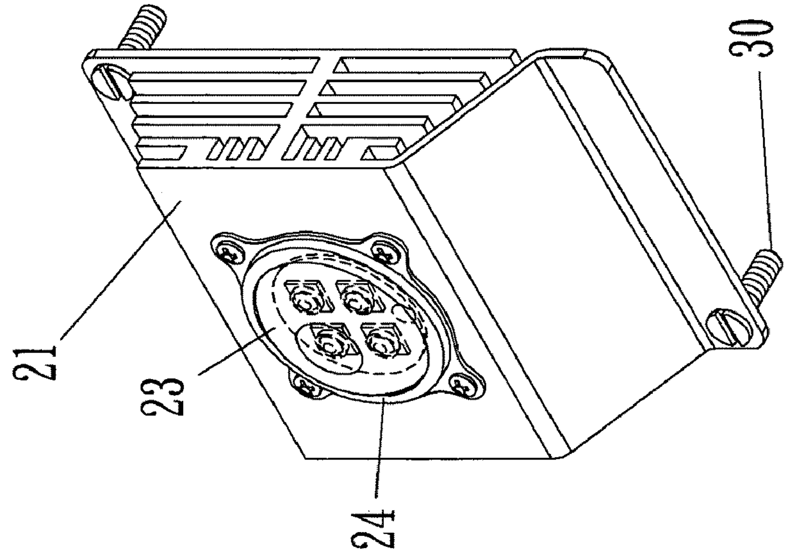
FIG. 4 is a schematic view showing the embodiment in FIG. 2 in other angle.
Figure 3:
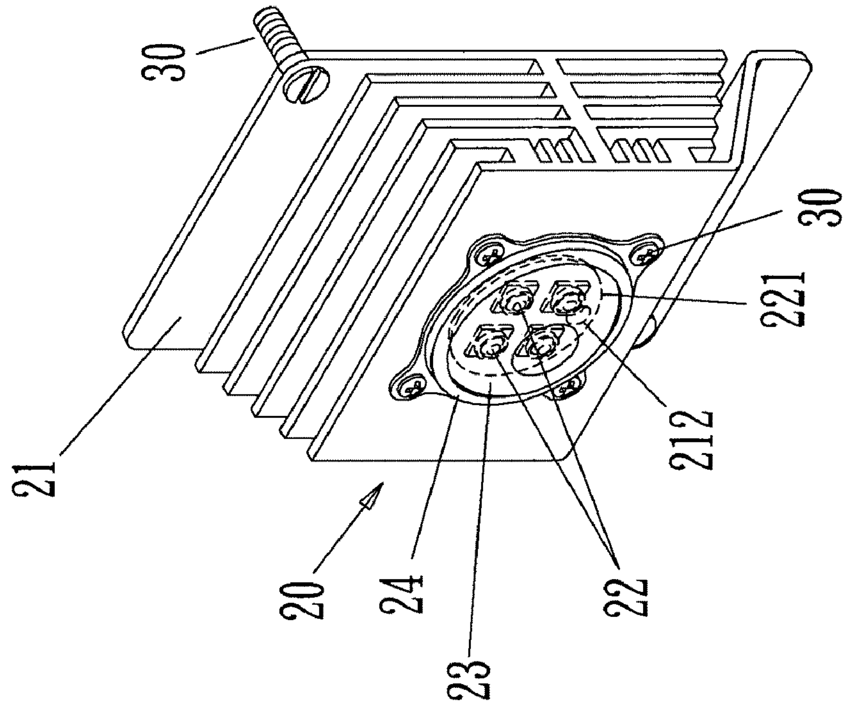
FIG. 3 is a schematic view showing the embodiment in FIG. 2.
Figure 5:
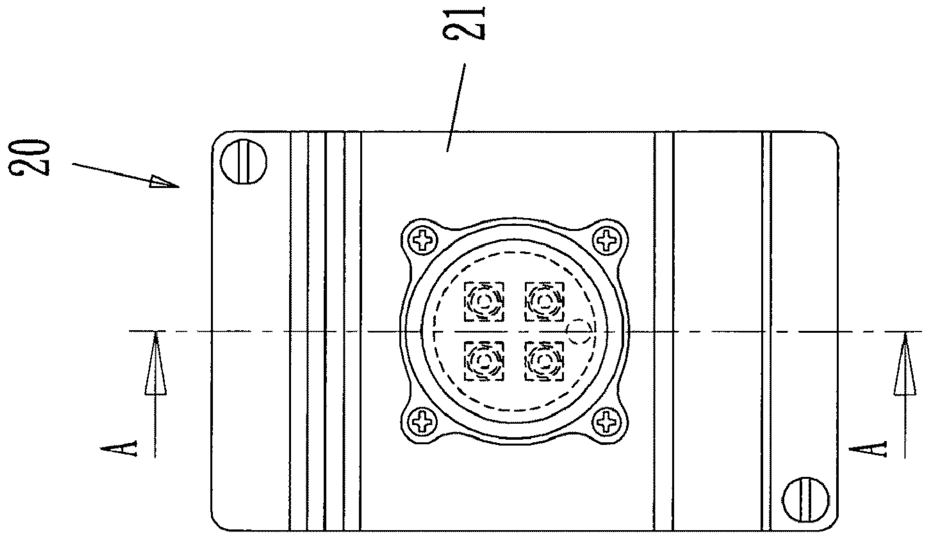
FIG. 5 is a front view showing the preferable embodiment of the present invention.
Figure 6:
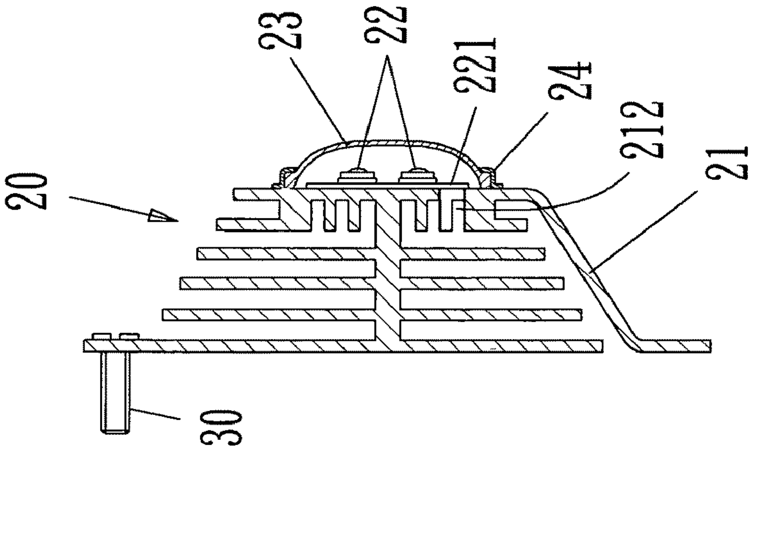
FIG. 6 is a cross section view of the FIG. 5 through a A-A line.

Referring to FIGS. 2 and 3, the transparent lens 23 glued to the metal heat sink 21 can be also fixed by a retaining ring 24 and retaining components 30. The metal heat sink has a plurality of threaded holes 213 opposite to a plurality of through holes 241 on the retaining ring 24. The transparent lens 23 is bound by a center opening of the retaining ring 24, and the retaining ring 24 is fixed to the metal heat sink 21 by fastening the retaining components 30 to the threaded holes 213 through the through holes 241.

Figure 8:
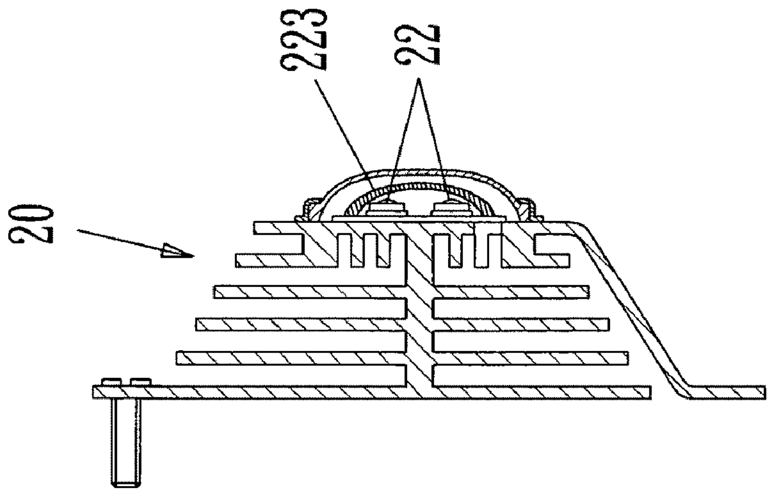
FIG. 8 is a schematic view showing a third embodiment of the present invention.
Figure 7:
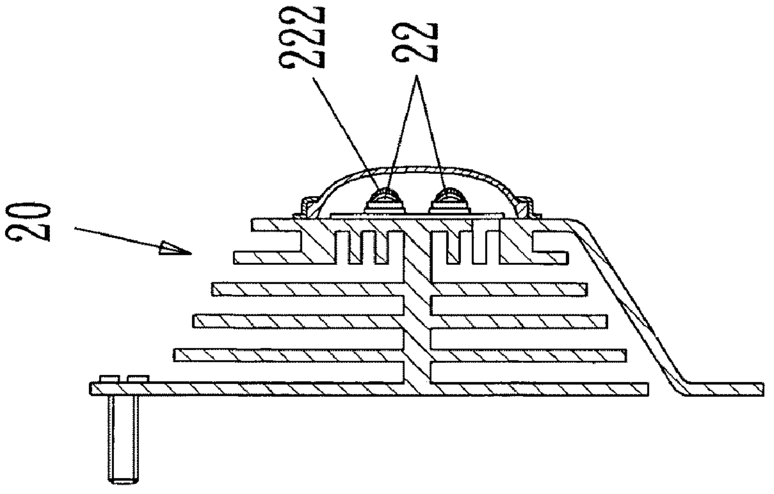
FIG. 7 is a schematic view showing a second embodiment of the present invention.

The LEDs 22 of the LED lamp set 20 are high power LEDs. Each LED 22 has a lens 222 as shown in FIG. 7. Or referring to FIG. 8, a large lens 223 is covering upon multiple LEDs 22.

Referring to FIGS. 2 and 3, each of the optimized LED lamp set 20 has 4 to 10 LEDs 22. The LEDs 22 can be 5-watt to 15-watt LEDs and with a total power between 40 watts to 80 watts.

Figure 9:
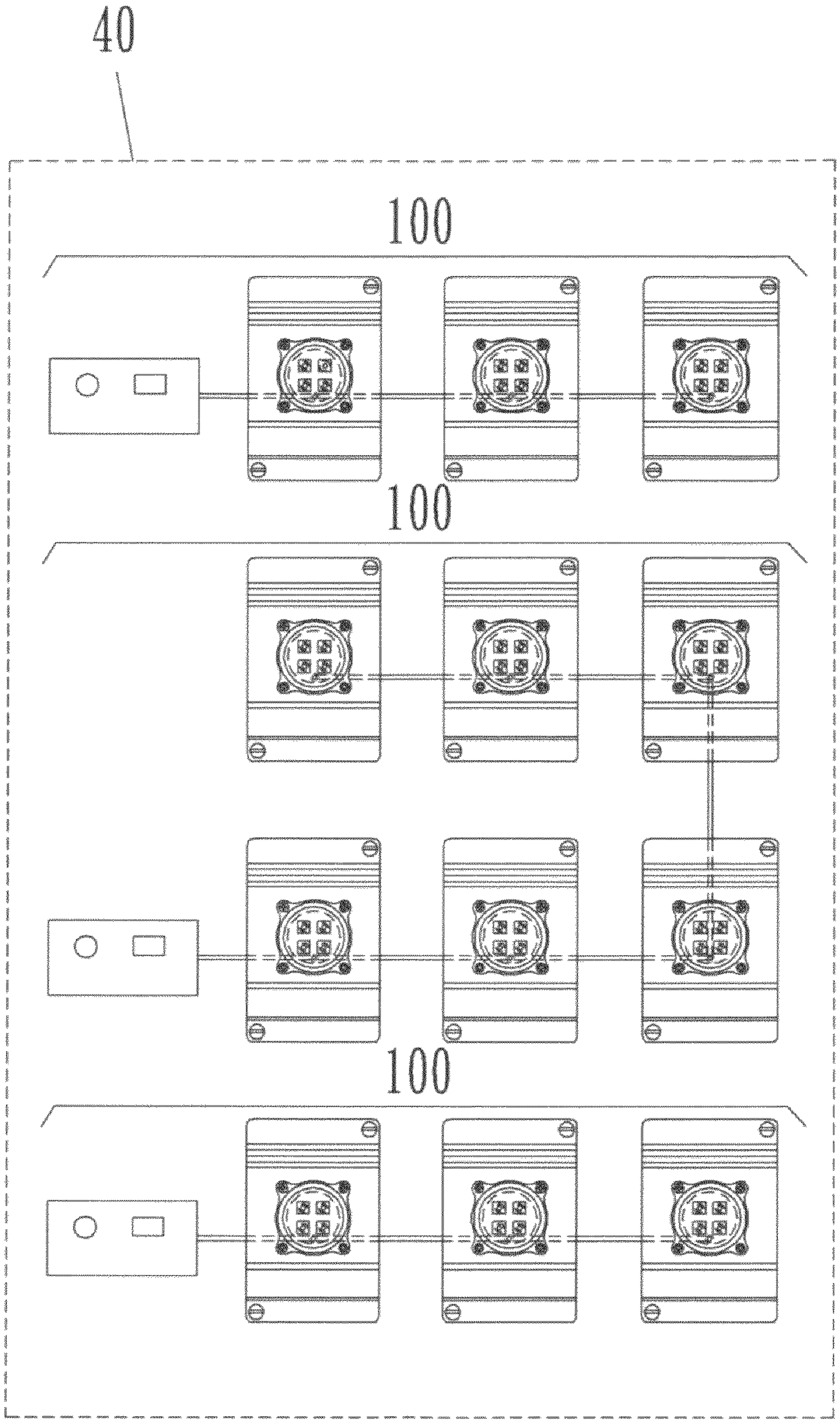
FIG. 9 is a schematic view showing a usage of the present invention.

Referring to FIG. 9, a plurality of LED lamp set 100 is arranged to an area such as a commercial box 40 or box of a sign board for providing required illumination.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A LED lamp device comprising a power unit serially linking a plurality of LED lamp sets by a power cord, wherein the power unit has a regulating circuit for supplying stable power to the plurality of LED lamp sets and a power switch to turn on or turn off the power; the LED lamp set further includes a metal heat sink for being fixed to a predetermined position and a plurality of LEDs being arranged to a circuit board; the circuit board is fixed to the metal heat sink; the circuit board is electrically connected to the power cord; the LED lamp set further includes a lens having an open receiving space for receiving the LEDs; a side of the lens is glued to the metal heat sink.

2. The LED lamp device as claimed in claim 1, wherein each LED lamp set has at least 4 to 10 LEDs with power between 5 watts to 15 watts.

3. The LED lamp device as claimed in claim 1, wherein the power unit has an indicator.

4. The LED lamp device as claimed in claim 1, wherein the metal heat sink has a plurality of dissipating fins and retaining holes for being fixed to a predetermined position by retaining components.

5. The LED lamp device as claimed in claim 1, wherein the metal heat sink is fixed to a predetermined position by glue.

6. The LED lamp device as claimed in claim 1, wherein a total power of each of the plurality of LED lamp set is between 40 watts to 80 watts.

7. The LED lamp device as claimed in claim 1, wherein the LEDs are high power LED.

8. The LED lamp device as claimed in claim 1, wherein a lens is arranged to each LED of the plurality of the LED lamp sets.

9. The LED lamp device as claimed in claim 1, wherein a large cover lens is arranged to multiple LEDs of the plurality of the LED lamp sets.

10. A LED lamp device comprising:

a power unit serially linking a plurality of LED lamp sets by a power cord; the power unit having a regulating circuit for supplying stable power to the plurality of LED lamp sets, and a power switch to turn on or turn off the power; the LED lamp set having a metal heat sink for being fixed to a predetermined position, and a plurality of high power LEDs being arranged to a circuit board; a cover lens being arranged to each LED of the plurality of the LED lamp sets; the circuit board being fixed to the metal heat sink; the circuit board being electrically connected to the power cord; the LED lamp set further having a lens having an open receiving space for receiving the plurality of the high power LEDs; a side of the lens being glued to the metal heat sink by glue.

11. The LED lamp device as claimed in claim 10, wherein the LED lamp device is arranged to an area such a commercial box, or box of a sign board for providing required illumination.

12. A LED lamp device comprising:

a power unit serially linking a plurality of LED lamp sets by a power cord; the power unit having a regulating circuit for supplying stable power to the plurality of LED lamp sets, and a power switch to turn on or turn off the power; the LED lamp set having a metal heat sink for being fixed to a predetermined position, and a plurality of high power LEDs being arranged to a circuit board; the circuit board being fixed to the metal heat sink; the circuit board being electrically connected to the power cord; the LED lamp set further having a lens having an open receiving space for receiving the plurality of the high power LEDs; a side of the lens being glued to the metal heat sink.

13. The LED lamp device as claimed in claim 12, wherein the LED lamp device is arranged to an area such a commercial box, or box of a sign board for providing required illumination.

* * * * *